Figure 1:
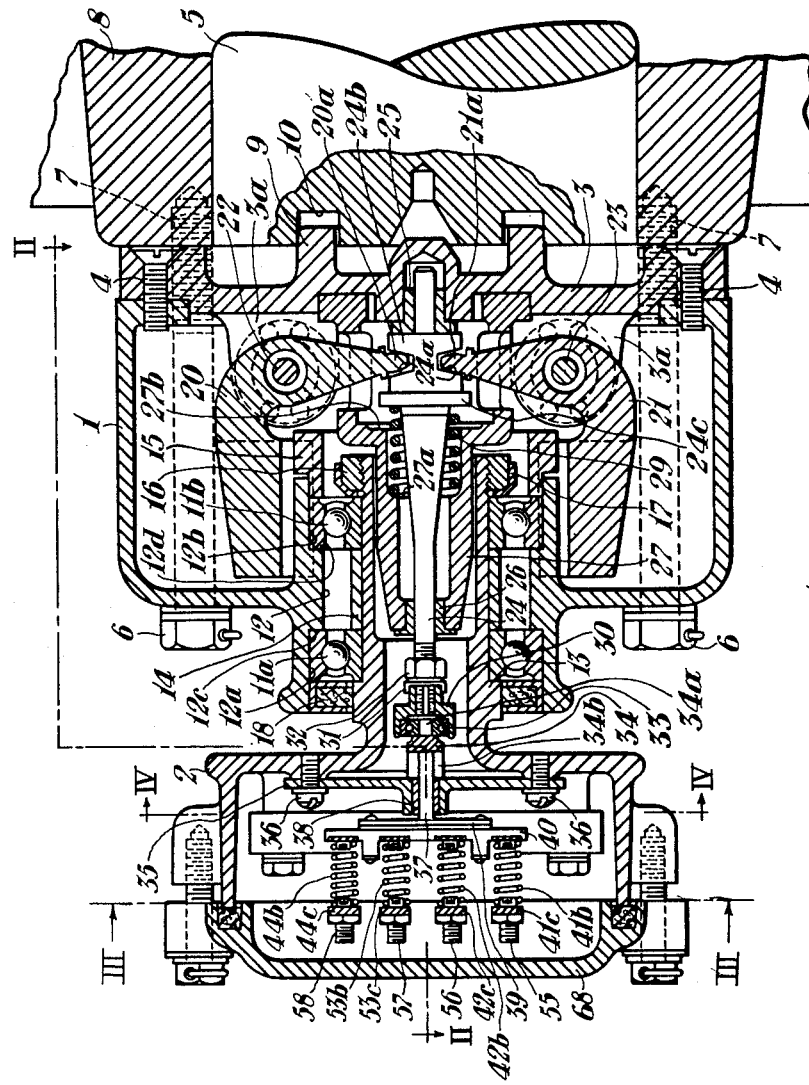

Feb. 10, 1953  H. L. BONE  2,628,294
SPEED RESPONSIVE DEVICE
Filed March 7, 1951  2 SHEETS—SHEET 1

INVENTOR.
*Herbert L. Bone*
BY
HIS ATTORNEY

INVENTOR.
Herbert L. Bone
BY
HIS ATTORNEY

Patented Feb. 10, 1953

2,628,294

UNITED STATES PATENT OFFICE 2,628,294

SPEED RESPONSIVE DEVICE

Herbert L. Bone, Forest Hills, Pa., assignor to Westinghouse Air Brake Company, a corporation of Pennsylvania Application March 7, 1951, Serial No. 214,392

6 Claims. (Cl. 200—80)

My invention relates to speed responsive devices, and particularly to speed responsive devices for use on locomotives.

This is a division of my copending application, Serial No. 631,161, filed on November 27, 1945, for Speed Responsive Devices.

Speed responsive devices are incorporated in train control systems and act in conjunction with the cab signaling system to control the air brake system of a train. The cab signaling system provides visual cab signals of the traffic conditions ahead of the train, while the speed responsive device enforces obedience to changes in the cab signal indications which require a reduction in train speed. Locomotive speed responsive devices normally comprise a governor operated in response to locomotive speed and a set of electrical contacts actuated by the push rod of the governor. The governor contacts are connected in the electrical circuit of the cab signaling system and are each individually adjusted so as to be actuated by the governor at predetermined speeds of the locomotive. The actuation of a particular electrical contact at a predetermined speed which is in excess of the speed permited by the cab signals, will provide a visual or audible warning signal. An acknowledgment of the warning signal within a specified time by a suitable reduction in the speed of the train will cut off the warning signal. Should the warning go unheeded, the continued actuation of the electrical contact by the governor will cause the brakes to be applied automatically to stop the train.

The speed responsive devices usually provided for locomotives comprise a housing for enclosing the governor and the electrical contacts, the governor being driven through a flexible coupling from the locomotive wheels. In one type of speed responsive device, the electrical contacts are sequentially operated in accordance with governor speed by a series of cams, a cam being provided for each set of contacts. The cams are adjustably secured on a rocker shaft which is rotated by the longitudinal movement of the push rod of the governor.

An object of my invention is to provide a speed responsive device which is simple, rugged, reliable and inexpensive to manufacture, wherein the electrical contacts are readily accessible and easily adjustable to vary the actuations thereof by the governor at any desired speed, and which at the same time is highly sensitive to speed variations both accelerating and decelerating.

Another object of my invention is to provide a speed responsive device which can be mounted on and driven by the end of an axle of the pony truck of a locomotive.

According to my invention the device comprises a main housing which is adapted to be bolted to the outer end of a wheel or an axle of the pony truck of a steam locomotive in axial alignment therewith in such manner that the housing will rotate with the axle. Pivotally supported inside of the housing on pivot pins which extend at right angles to, and are equally spaced from, the longitudinal axis of the housing are two similar centrifuge members. These centrifuge members are each formed with a weight arm extending parallel to the axis of the housing, and with an operating arm extending radially toward the axis of the housing, and are each provided at the inner end of the operating arm with a gear tooth which extends into and cooperates with a recess formed in a push rod. The push rod is guided by means of suitable guide bearings for longitudinal sliding movement within the housing, and is biased by means of a compressed coil spring to the longitudinal position in which the weight arms of the centrifuge members occupy their inner extreme positions, whereby when the axle is rotating the resultant centrifugal force will tend to move the push rod from one extreme position to another.

The outer end of the push rod is provided with an antifriction thrust assembly including a tappet which cooperates with a cross member operatively connected with a plurality of movable contact fingers which, together with associated fixed contact fingers, comprise governor contacts. These contacts are mounted in a separate or auxiliary housing which is journalled in ball bearings secured within a bearing opening provided in the outer end of the main housing, a cable connection serving as a torque arm preventing the auxiliary housing from rotating when the main housing is rotated in response to the rotation of the axle. The movable contact fingers and the fixed contact fingers are normally in engagement and biased toward each other. The fixed contact fingers are provided with individual limit stops which are adjustable so that the contact fingers may be made to open and close at any desired speed within the limits of the device.

Other objects and characteristic features of my invention will become apparent as the description proceeds.

I shall describe one form of a speed responsive device embodying my invention, and shall then point out the novel features thereof in claims.

Figure 4:
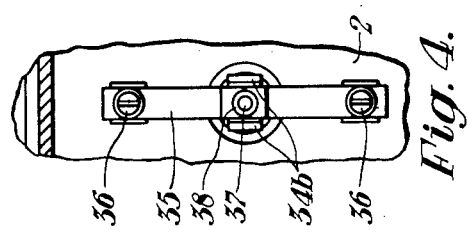
Figure 2:
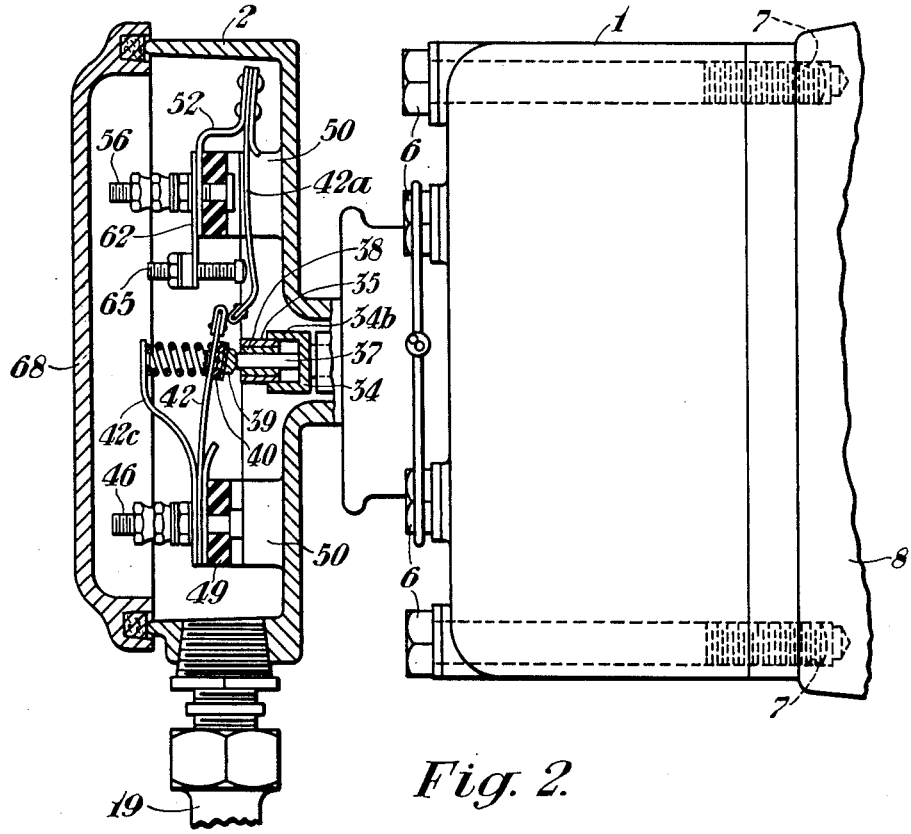
Figure 3:
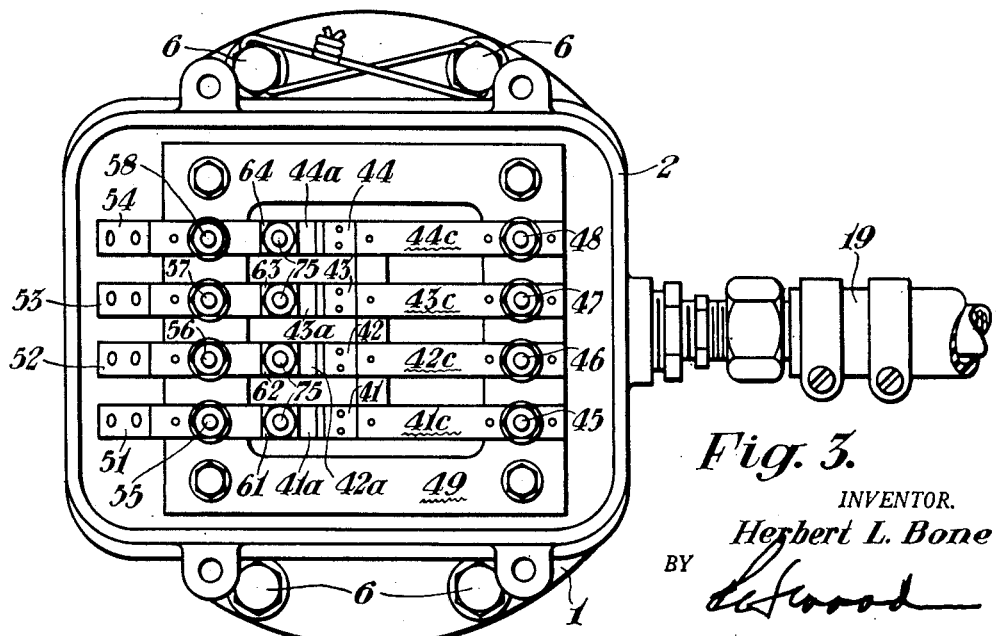

In the accompanying drawings, Fig. 1 is a vertical longitudinal sectional view showing a speed responsive device embodying my invention. Fig. 2 is a left-hand end view of the device shown in Fig. 1 with the cover of the auxiliary or contact housing removed to better illustrate the construction of the contact assembly of the device, while Figs. 3 and 4 are detail sectional views taken substantially on the lines III—III and IV—IV, respectively, of Fig. 1.

Similar reference characters refer to similar parts in each of the several views.

Referring to the drawings, the speed responsive device comprises a main housing 1 and an auxiliary housing 2. The main housing 1 is closed at one end by an end plate 3 secured in place by machine screws 4, and is adapted to be mounted on the end of a car or locomotive axle, such as a pony truck axle 5 by means of a plurality of bolts 6 which pass through clearance holes in the housing and are screwed into threaded holes 7 formed in the pony wheel 8 mounted on the axle. It will be apparent, therefore, that when the wheel 8 and axle 5 rotate, the housing 1 will rotate therewith. For reasons which will be obvious, it is desirable to maintain the housing 1 in concentric relation to the axle 5, and to this end the end plate 3 is provided with an annular projection or rib 9 concentric with the housing, which rib extends into and cooperates with a concentric recess 10 machined in the end of the axle.

A pair of ball bearings 11a and 11b are fitted within counterbores 12a and 12b formed in a bearing opening 12 provided in the outer end of the main housing 1, and the inner races of these bearings snugly receive a tubular extension 13 formed on the auxiliary housing 2. The bearings 11a and 11b are spaced apart in the bearing opening 12 by means of shoulders 12c and 12d formed at the inner ends of the counterbores, and on the tubular extension 13 by a spacing sleeve 14 having the same length as the distance between the shoulders 12c and 12d. The outer race of the bearing 11b is secured in place in the counterbore 12b by a bearing retainer 15 secured to the main housing 1, while the inner races of the bearings are secured to the tubular extension 13 by a nut 16 screwed onto the threaded inner end of the tubular extension 13. The nut 16 is locked in place by a lock washer 17. The space between the bearings is packed with a suitable lubricant, and a felt oil seal 18 is provided to protect the outside bearing 11a from dirt and moisture. A cable connection 19 (see Fig. 2) which extends from the housing 2 to the locomotive frame, serves as a torque arm to prevent the auxiliary housing 2 from rotating when the main housing is rotated in response to rotation of the axle 5. It will be apparent, therefore, that the auxiliary housing 2 remains stationary at all times.

The main housing 1 houses a centrifuge assembly, while the auxiliary housing 2 houses a contact assembly, the contacts of which are operated by the centrifuge in response to changes in the speed of rotation of the axle 5.

The centrifuge assembly in the form here shown comprises two centrifuge members 20 and 21 pivotally supported on pivot pins 22 and 23 which extend at right angles to, and are equally spaced from, the longitudinal axis of the housing 1. The pivot pins 22 and 23 are supported in adjustable eccentric bushings (not shown) supported in laterally extending lugs 3a formed on the end plate 3. The eccentric bushings are provided for the adjustment of the pivot points of the centrifuge members, as more fully described in my aforesaid copending application. The centrifuge members are each formed with a curved weight arm which extends parallel to the axis of the housing 1, and with an operating arm which extends radially toward the axis of the housing. The operating arms are provided at their inner ends with gear teeth 20a and 21a, respectively, which gear teeth extend into and cooperate with tooth openings 24a formed in a rectangular portion 24b of a push rod 24. The push rod 24 is slidably supported at one end in a bearing bushing 25 mounted in the end plate 3, and at the other end in a bearing bushing 26 mounted in the end of a tubular push rod guide 27 secured by suitable means to the end plate 3. A compressed coil spring 29 surrounds the push rod between a shoulder 27a formed in the guide 27 intermediate its ends and an annular flange 24c provided on the push rod, and constantly biases the push rod to the longitudinal position in which the rectangular portion of the push rod abuts against the flanged end of the bearing bushing 25. The parts are so proportioned that when the push rod occupies the position to which it is biased, the weight arms of the centrifuge members 20 and 21 will be rotated to their inner extreme positions, and it will be apparent, therefore, that when the centrifuge assembly is rotated in response to rotation of the axle 5, the weight arms will tend to fly outwardly and will thereby move the push rod toward the left as viewed in Fig. 1. The extreme left-hand position to which the push rod is free to move is limited by engagement of the annular flange 24c with a stop surface 27b provided on the push rod guide 27.

The left-hand end of the push rod 24 is provided with an antifriction thrust assembly comprising bearing cup 30 screwed onto the threaded end of the rod and locked in place by means of a lock washer 31 and a jam nut 32. A ball bearing 33 is secured within the outer end of this bearing cup by peening over the outer edge of the cup, and the inner race of this bearing receives the rounded end 34a of a U-shaped thrust member 34, the arms 34b of which (see Fig. 3) straddle with some clearance a tappet guide 35 secured by means of screws 36 (Fig. 4) to the inner side of the right-hand wall of the auxiliary housing 2 as viewed in Fig. 1. The yoke of the U-shaped thrust member bears against one end of a tappet 37, the outer end of which is slidably mounted in a sleeve 38 pressed into the tappet guide 35. The free end of the tappet 37 engages a hardened steel bar 39 (see Fig. 3) secured to an insulating member 40 which latter in turn is riveted to a plurality of movable contact fingers 41, 42, 43 and 44, respectively. The movable contact fingers are secured by means of terminal posts 45, 46, 47 and 48 to an insulating support 49 attached to bosses 50 formed on the right-hand wall of the auxiliary housing 2, and each cooperates with a fixed contact finger 41a, 42a, 43a and 44a to form an associated contact 41—41a, 42—42a, 43—43a and 44—44a, respectively. The fixed contact fingers are riveted at their free ends to associated supporting brackets 51, 52, 53 and 54 secured by means of terminal posts 55, 56, 57 and 58 to the insulating support 49. The terminal posts 55, 56, 57 and 58 also secure to the insulating support 49 four strips 61, 62, 63 and 64 each of which carries at its outer or free end an adjusting screw 65 which cooperates with the associated contact finger to limit the movement of the finger under certain conditions which will be made clear presently. Associated with each movable contact finger is a compressed coil spring 41b, 42b, 43b or 44b which is interposed between the finger and associated spring support 41c, 42c, 43c or 44c. These springs serve to provide a predetermined initial tension to the movable contact fingers sufficient to close the contacts when the governor is at rest.

The parts are so proportioned that when the governor is at rest, the fixed contact fingers will each be moved by engagement of the associated movable contact finger to a position in which there is a predetermined initial clearance between the associated stop screw and the finger. As the push rod 24 moves toward the left, as viewed in Fig. 1, in response to an increase in speed in the axle 5, both the fixed and movable contact fingers will move in unison until the fixed contact fingers are stopped by engagement of the associated adjusting screws 65, whereupon further movement of the push rod will cause the contacts to open. The movable contact fingers will continue to move until the push rod has been moved to the position in which the annular flange 24c engages the stop surface 27b of the push rod guide 27. It will be obvious, therefore, that the speed at which the individual contacts open may be adjusted by adjusting the corresponding adjusting screws 65.

In order to permit ready inspection of the contacts and adjustment when necessary, the outer end of the auxiliary housing 2 is closed by a removable cover 68.

The operation of the governor as a whole will be readily understood from an inspection of the drawing and from the foregoing description without the necessity for further detailed description.

Although I have herein shown and described only one form of a speed responsive device embodying my invention, it is understood that various changes and modifications may be made therein within the scope of the appended claims without departing from the spirit and scope of my invention.

Having thus described my invention, what I claim is:

1. A speed responsive device comprising a first housing adapted to be rotated at different speeds, centrifuge means in said first housing including an axially disposed push rod which is moved longitudinally in response to changes in the speed of rotation of said first housing, a second housing journaled in the outer end of said first housing, means for preventing said second housing from rotating, contact mechanism in said second housing, and an antifriction thrust assembly operatively connecting said push rod with said contact mechanism.

2. A speed responsive device comprising a centrifuge assembly which is rotated at different speeds and which includes a push rod which is moved longitudinally along the axis of rotation of said assembly in response to changes in speed thereof, a tappet guide, a tappet slidably mounted in a bearing provided in said guide, a U-shaped member connected at one end by a thrust type ball bearing to said push rod and disposed with its arms straddling said guide and with its yoke engaging one end of said tappet, and contacts operated by longitudinal movement of said tappet.

3. A contact mechanism for a speed responsive device comprising a fixed and a movable contact finger cooperating at one end to form a contact and secured respectively at the other end to insulating supports, brackets secured to said supports in spaced relation to said fingers, an adjusting screw carried by the bracket associated with said fixed finger and cooperating with said fixed finger to move it to different positions from that which it would assume due to its inherent resiliency, a compressed coil spring interposed between said movable finger and the associated bracket and acting to bias said movable finger to the position in which it engages said fixed finger with sufficient force to spring said fixed finger away from said screw, whereby the position at which the contact formed by the finger will open is determined by the adjustment of said adjusting screw.

4. A speed responsive device comprising a centrifuge assembly which is rotated at different speeds and which includes a push rod which is moved longitudinally along the axis of rotation of said assembly in response to changes in speed thereof, a tappet guide, a tappet slidably mounted in a bearing provided in said guide, a U-shaped member connected at one end by a thrust type ball bearing to said push rod and disposed with its arms straddling said guide and with its yoke engaging one end of said tappet, a plurality of contacts each comprising a relatively fixed and a relatively movable resilient contact finger cooperating at one end to form a contact and secured respectively at the other end to insulating supports, brackets secured to said supports and disposed in spaced relation to said fingers, means securing all of said movable fingers together including a bar cooperating with said tappet whereby movement of said tappet will move said fingers in the direction to operate said contacts, an adjusting screw carried by the bracket associated with each finger adjusted to move the finger away from the position it would normally occupy due to its inherent resiliency, a compressed coil spring interposed between each movable finger and the associated bracket and acting to bias such movable finger to the positions in which it engages the associated fixed finger with sufficient force to spring it away from engagement with the associated adjusting screw, whereby said contacts will not open until a predetermined initial movement of said push rod has taken place and when they do open they will open at positions determined by the adjustments of said adjusting screws.

5. Control apparatus, comprising a pair of engaged contacts biased toward each other, a movable member cooperating with one of said contacts to disengage the first contact from the second contact upon movement of said member, and a limit stop for the second contact to limit the biased movement of said second contact with said first contact as said first contact is moved by said member to disengage said second contact, said limit stop determining the extent of movement of said movable member to disengage said contacts.

6. Control apparatus, comprising a plurality of spaced pairs of engaged contacts biased toward each other, an insulating member fixed to the first contact of each pair of contacts, a movable member cooperating with said insulating member to move said member to disengage said first contacts from the second contacts of each pair of contacts upon movement thereof by said movable member, and an adjustable limit stop for each of said second contacts to limit the biased movement of said second contacts with said first contacts as said first contacts are moved by said insulating member to disengage said contacts, said adjustable limit stops determining the extent of movement of said movable member for disengaging each individual pair of engaged contacts.

HERBERT L. BONE.

REFERENCES CITED

The following references are of record in the file of this patent:

UNITED STATES PATENTS

| Number | Name | Date |
|---|---|---|
| 2,211,554 | Bone | Aug. 13, 1940 |

FOREIGN PATENTS

| Number | Country | Date |
|---|---|---|
| 398,585 | Germany | July 14, 1924 |
| 436,385 | Germany | Nov. 3, 1926 |